(12) United States Patent
Treadwell

(10) Patent No.: US 9,452,480 B2
(45) Date of Patent: Sep. 27, 2016

(54) RECIPROCATING SAW ATTACHMENT

(71) Applicant: Clifford W. Treadwell, Austin, TX (US)

(72) Inventor: Clifford W. Treadwell, Austin, TX (US)

(*) Notice: Subject to any disclaimer, the term of this patent is extended or adjusted under 35 U.S.C. 154(b) by 199 days.

(21) Appl. No.: 14/215,914

(22) Filed: Mar. 17, 2014

(65) Prior Publication Data
US 2015/0258620 A1 Sep. 17, 2015

(51) Int. Cl.
| | |
|---|---|
| *B26B 29/00* | (2006.01) |
| *B27B 3/12* | (2006.01) |
| *B27B 3/26* | (2006.01) |
| *B26B 9/00* | (2006.01) |
| *B26B 9/02* | (2006.01) |
| *B23D 51/04* | (2006.01) |
| *B23D 49/00* | (2006.01) |
| *B23D 49/16* | (2006.01) |

(52) U.S. Cl.
CPC ........... *B23D 51/046* (2013.01); *B23D 49/002* (2013.01); *B23D 49/162* (2013.01)

(58) Field of Classification Search
CPC . B23D 51/046; B23D 49/002; B23D 49/162
USPC ............ 30/286, 295, 277.4, 392–394, 166.3, 30/346, 355, 357
See application file for complete search history.

(56) References Cited

U.S. PATENT DOCUMENTS

| | | | | |
|---|---|---|---|---|
| 1,592,999 A | * | 7/1926 | Williams | B23D 49/002 30/372 |
| 2,122,611 A | * | 7/1938 | Kirby | B23D 49/162 30/376 |
| 2,137,893 A | * | 11/1938 | Elder | B23D 49/162 30/393 |
| 2,227,844 A | * | 1/1941 | Roche | B23D 49/002 30/124 |
| 2,568,791 A | * | 9/1951 | Cooper | B23D 49/002 30/372 |
| 2,724,417 A | * | 11/1955 | Williams | B23D 49/002 30/166.3 |
| 2,747,622 A | * | 5/1956 | Saye | A22B 5/207 30/374 |
| 3,181,239 A | * | 5/1965 | Skok | A01G 3/08 30/294 |
| 3,373,779 A | * | 3/1968 | Taft | B23D 49/162 30/122 |
| 3,755,896 A | * | 9/1973 | Tommerup | B27B 19/002 30/372 |
| 3,805,383 A | | 4/1974 | McNally | |
| 3,834,019 A | * | 9/1974 | Smeltzer | B23D 51/046 30/378 |
| 3,876,015 A | * | 4/1975 | Kivela | A01D 69/02 144/35.1 |
| 4,615,251 A | * | 10/1986 | Volk | B23Q 9/005 30/392 |
| 4,894,917 A | * | 1/1990 | Nicolson | B23D 51/10 125/18 |
| 4,949,463 A | * | 8/1990 | Chen | B23D 49/162 144/136.1 |
| 4,962,588 A | * | 10/1990 | Fushiya | B23D 49/002 30/372 |

(Continued)

*Primary Examiner* — Ghassem Alie
*Assistant Examiner* — Bharat C Patel
(74) *Attorney, Agent, or Firm* — Meyertons, Hood, Kivlin, Kowert & Goetzel, P.C.; Eric B. Meyertons

(57) ABSTRACT

In some embodiments, a method and/or system may include a reciprocating saw system. The reciprocating saw system may include a housing and a reciprocating blade. The system may include an elongated member. When activated the elongated member may move from a first position to a second position such that a workpiece is positioned adjacent at least a portion of the housing and the reciprocating blade. The system may include a tension mechanism coupled to the elongated member. When the tension mechanism is activated the elongated member may move from the first position to the second position. In some embodiments, the system may include an engaging mechanism. The engaging mechanism, when activated, releases a first stop positioned distally on the housing. In some embodiments, when the first stop is released, when a tensile force is applied to the conveyor, the conveyor moves proximally moving the elongated member to the second position.

19 Claims, 4 Drawing Sheets

(56) References Cited

U.S. PATENT DOCUMENTS

| | | | | |
|---|---|---|---|---|
| 5,269,064 A * | 12/1993 | Greene | B27G 19/003 30/371 |
| 5,611,146 A * | 3/1997 | Ducret | B23D 49/002 269/182 |
| 5,632,089 A * | 5/1997 | Sakamoto | B23D 49/002 30/372 |
| 5,806,187 A * | 9/1998 | Ducret | B23D 49/002 269/239 |
| 6,067,716 A * | 5/2000 | Carter | B23D 49/002 30/378 |
| 6,449,851 B1 * | 9/2002 | Bone | B23D 51/046 269/237 |
| 6,484,409 B2 * | 11/2002 | Campbell | A01G 3/08 30/371 |
| 7,121,008 B2 | 10/2006 | Bone et al. | |
| 7,257,895 B2 * | 8/2007 | Makkonen | B23D 45/124 269/242 |
| 8,146,258 B2 * | 4/2012 | Shafer | B23D 49/162 30/371 |
| 2008/0173138 A1 | 7/2008 | Dayton et al. | |
| 2010/0031518 A1 * | 2/2010 | Fedor | B23D 49/162 30/392 |

* cited by examiner

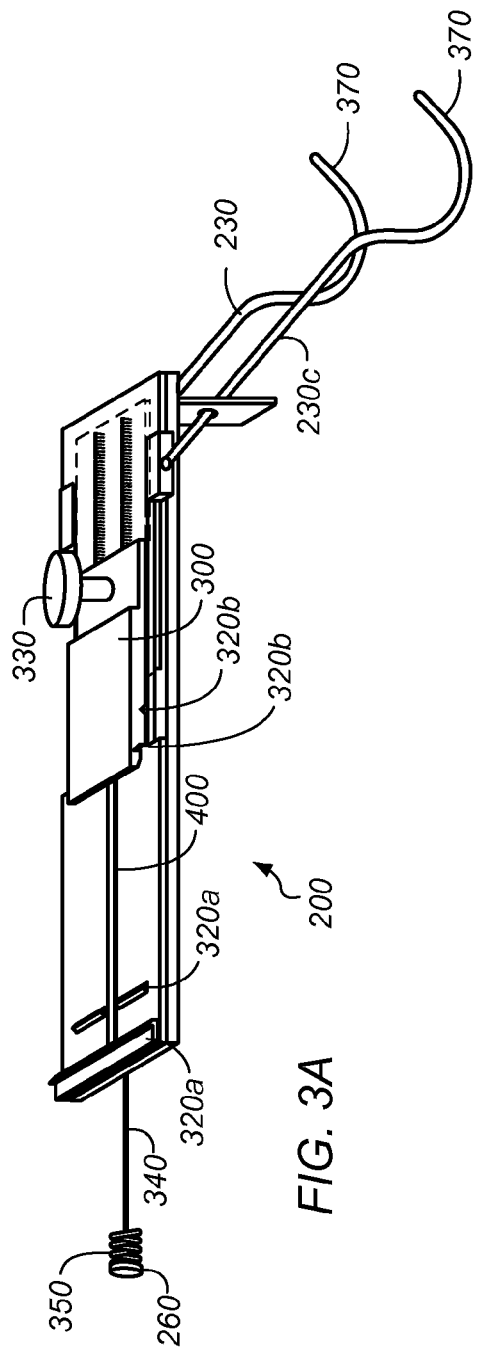
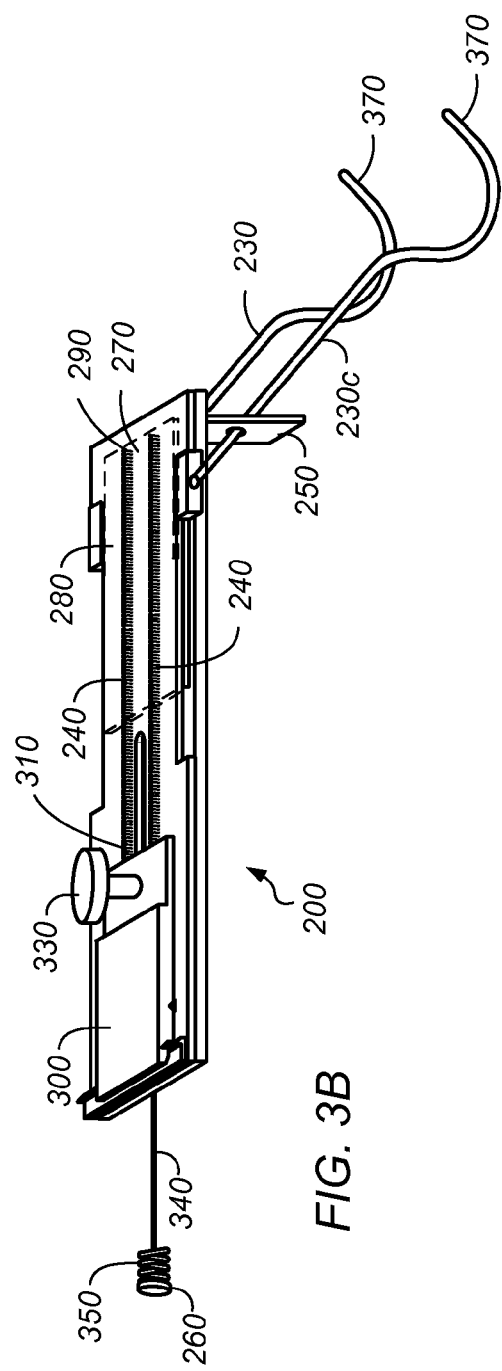
FIG. 3A
FIG. 3B

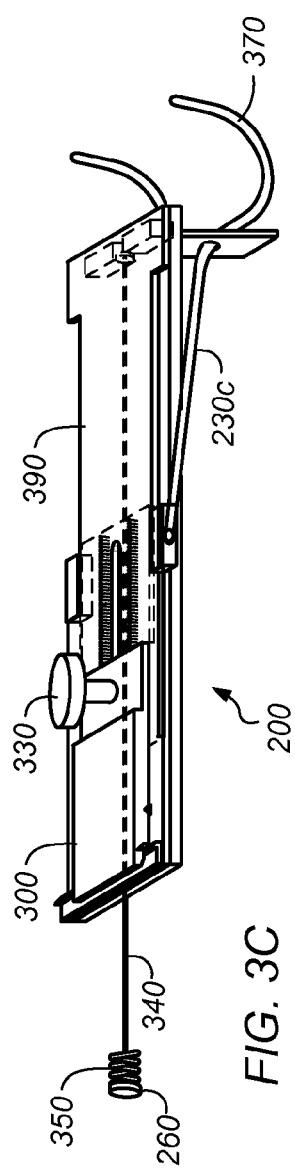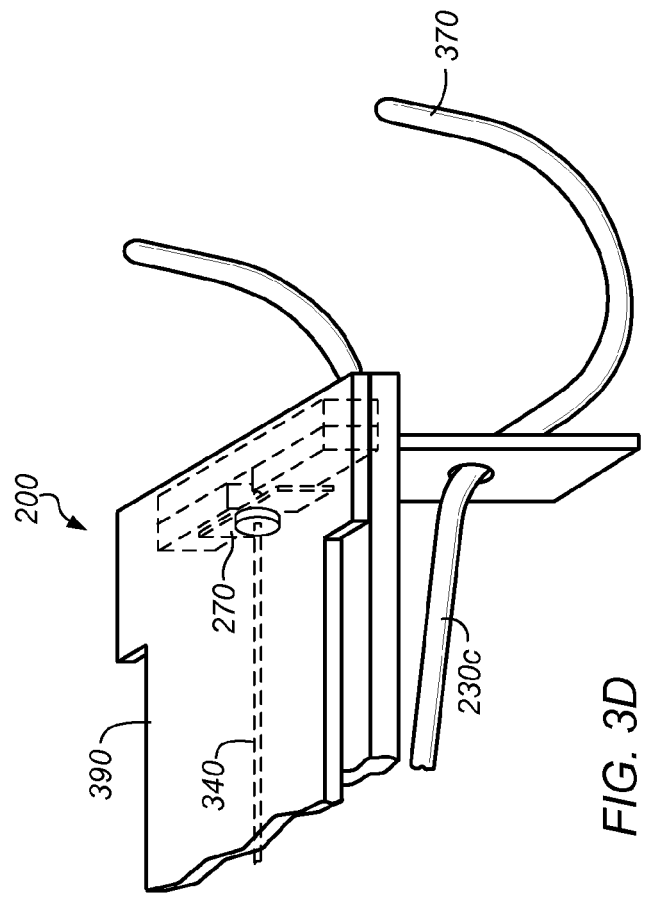
FIG. 3C
FIG. 3D

RECIPROCATING SAW ATTACHMENT

BACKGROUND OF THE INVENTION

1. Field of the Invention

The present disclosure generally relates to systems and methods related to an improved reciprocating saw. More particularly, the disclosure generally relates to systems and methods for a reciprocating saw which couples one or more workpieces to the reciprocating saw during use.

2. Description of the Relevant Art

Reciprocating saws typically incorporate reciprocating drive shafts for driving linear saw blades. The saw blades are driven along a predetermined path so as to provide a cutting action (e.g., either a rectilinear or an orbital motion). Efficient cutting with a reciprocating saw typically requires the workpiece to be secured in some fashion. Otherwise, the workpiece may move relative to the saw as a result of reciprocation of the saw blade. Securing the workpiece manually, by oneself or with an assistant, is not only problematic but also potentially dangerous.

SUMMARY

In some embodiments, a system may include a reciprocating saw system. The reciprocating saw system may include a housing and a reciprocating blade. The reciprocating blade may be couplable to and extending from the housing. The system may include an elongated grasping member. When activated the elongated grasping member may move from a first position to a second position such that a workpiece is positioned adjacent at least a portion of the housing and the reciprocating blade. The system may include a tension mechanism coupled to the elongated grasping member. When the tension mechanism is activated the elongated grasping member may move from the first position to the second position. In some embodiments, the system may include an engaging mechanism. The engaging mechanism, when activated, releases a first stop positioned distally on the housing. The first stop may inhibit proximal movement of a conveyor coupled to the elongated grasping member and a distal end of the tension mechanism. In some embodiments, when the first stop is released, when a tensile force is applied to the conveyor, the conveyor moves proximally moving the elongated grasping member to the second position. In some embodiments, the system may include a loading mechanism. The loading mechanism may be coupled to a proximal end of the tension mechanism. The loading mechanism may be inhibited by a second stop when engaged from moving towards a distal end of the housing.

In some embodiments, when the second stop is disengaged the tensile force on the tension mechanism is released. In some embodiments, when the second stop is disengaged the tensile force on the tension mechanism is released such that the workpiece is released.

In some embodiments, the second stop is disengaged by manually applying pressure to a portion of the loading mechanism.

In some embodiments, the engaging mechanism is activated at a proximal end of the housing. In some embodiments, the engaging mechanism comprises a spring loaded elongated engaging member moveable from a first position to a second position when activated.

In some embodiments, the elongated grasping member comprises at least two elongated grasping members positioned on opposing sides of the housing. In some embodiments, the elongated grasping member may include a distal grasping portion which engages the workpiece during use.

The elongated grasping member may include a proximal portion which is curved such that when the elongated grasping member moves from the first position to the second position the distal grasping portion moves up and back in a proximal direction.

In some embodiments, the system may include at least one track along which the conveyor and/or the loading mechanism are positionable.

In some embodiments, a method may include stabilizing a workpiece relative to a reciprocating saw system. The method may include activating a tension mechanism by applying a tensile force to the tension mechanism. The method may include inhibiting a loading mechanism, coupled to a proximal end of the tension mechanism, using a second stop when engaged from moving towards a distal end of the housing. The method may include activating an engaging mechanism to release a first stop positioned distally on the housing. The first stop may inhibit proximal movement of a conveyor coupled to the elongated grasping member and a distal end of the tension mechanism. When the first stop is released, when a tensile force is applied to the conveyor, the conveyor may move proximally. The method may include moving an elongated grasping member from a first position to a second position using the conveyor. The method may include positioning a workpiece, using the elongated grasping member, adjacent at least a portion of a housing and a reciprocating blade. The reciprocating blade may be couplable to and extend from the housing.

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 3A depicts a diagram of an embodiment of a reciprocating saw stabilizing system in an unloaded and unengaged state.

FIG. 3B depicts a diagram of an embodiment of a reciprocating saw stabilizing system in a loaded and unengaged state.

FIG. 3C depicts a diagram of an embodiment of a reciprocating saw stabilizing system in a loaded and engaged state.

FIG. 3D depicts a diagram of a distal end of an embodiment of a reciprocating saw stabilizing system in a loaded and engaged state.

Figure 1:
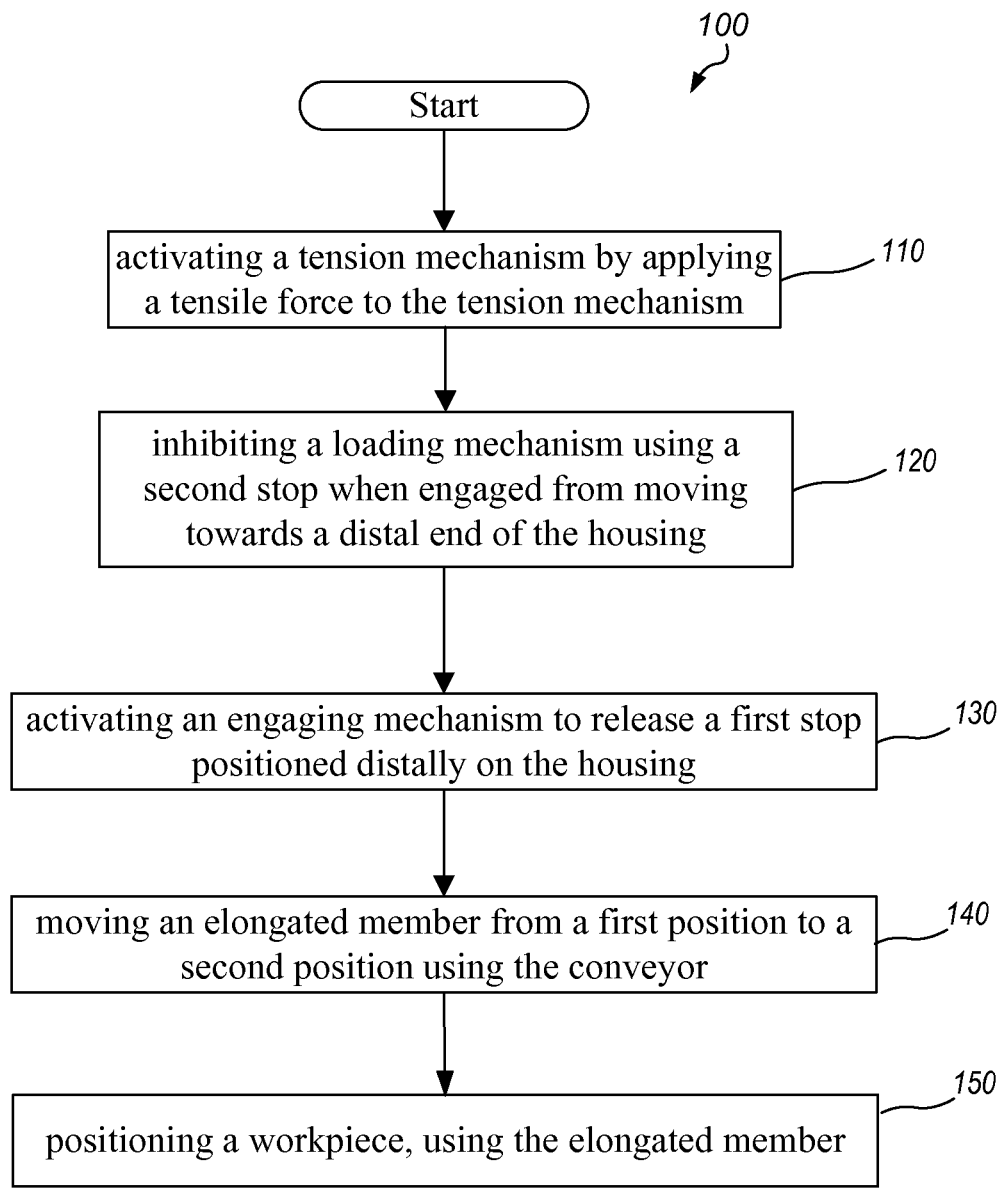
FIG. 1 depicts a method of stabilizing a workpiece relative to a reciprocating saw system.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process affects another process or structure without the involvement of an intermediate step or component.

In some embodiments, a system may include a reciprocating saw system. FIG. 1 depicts a method 100 of stabilizing a workpiece relative to a reciprocating saw system. In some embodiments, a method may include stabilizing a workpiece relative to a reciprocating saw system. The method may include activating 110 a tension mechanism by applying a tensile force to the tension mechanism. The method may include inhibiting 120 a loading mechanism, coupled to a proximal end of the tension mechanism, using a second stop when engaged from moving towards a distal end of the housing. The method may include activating 130 an engaging mechanism to release a first stop positioned distally on the housing. The first stop may inhibit proximal movement of a conveyor coupled to the elongated grasping member and a distal end of the tension mechanism. When the first stop is released, when a tensile force is applied to the conveyor, the conveyor may move proximally. The method may include moving 140 an elongated grasping member from a first position to a second position using the conveyor. The method may include positioning 150 a workpiece, using the elongated grasping member, adjacent at least a portion of a housing and a reciprocating blade. The reciprocating blade may be couplable to and extend from the housing.

Figure 2:
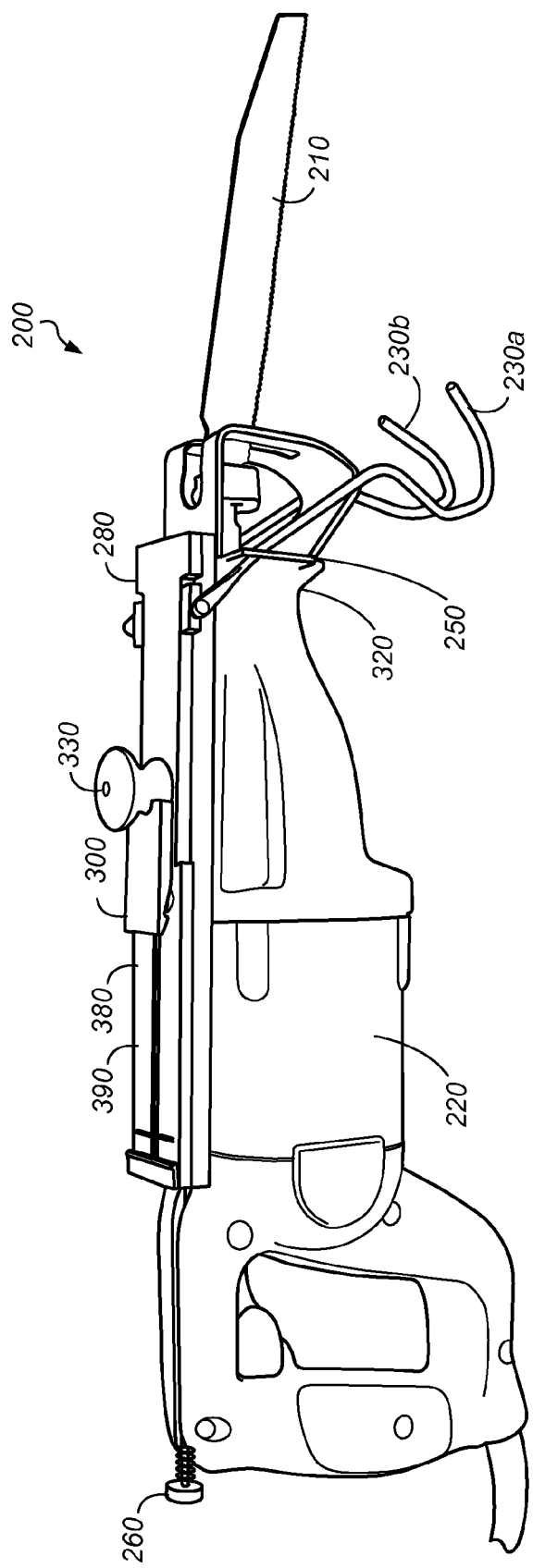
FIG. 2 depicts a diagram of an embodiment of a reciprocating saw system including a reciprocating saw blade.

FIG. 2 depicts a diagram of an embodiment of a reciprocating saw system 200 including a reciprocating saw blade 210. The reciprocating saw system may include a housing and the reciprocating blade 210. The reciprocating blade may be couplable to and extending from the housing. In some embodiments, a reciprocating saw system may function to move the blade, for example, in a back and forth sawing motion or an elliptical motion.

Reciprocating blades may include any number of different types of blades. For example, blades may function to cut wood, metal, glass, ceramic, etc. In some embodiments, the system may include other attachments besides a saw blade couplable to and extending from the housing. The system may include other attachments which function in a reciprocating manner. For example, the system may include an abrasive attachment such as a sanding attachment. In some embodiments, the system may include attachments which do not necessarily function in a reciprocating manner, for example, an elliptical motion, etc.

FIGS. 3A-D depict diagrams of an embodiment of a reciprocating saw stabilizing system in different states of engagement. Embodiments depicted in FIG. 3 depict only the stabilizing system and not the saw etc. to which the system is attached. As such in some embodiments, the stabilizing system may be assembled separately as an add-on attachment for a number of different tool systems. In other embodiments, the stabilizing system may come preassembled with a tool system as a built in complete unit. The system may include an elongated grasping member 230. When activated the elongated grasping member may move from a first position to a second position such that a workpiece is positioned adjacent at least a portion of the housing and the reciprocating blade. The system may include a tension mechanism 240 coupled to the elongated grasping member. When the tension mechanism is activated the elongated grasping member may move from the first position to the second position. In some embodiments, the system may include guides 250. In some embodiments, the system may include an engaging mechanism 260. The engaging mechanism, when activated, may release a first stop 270 positioned distally on the housing (e.g., as depicted in FIG. 3D wherein the first stop is flexes and is pushed down by the engaging mechanism). The first stop may inhibit proximal movement of a conveyor 280 coupled to the elongated grasping member and a distal end 290 of the tension mechanism. In some embodiments, when the first stop is released, when a tensile force is applied to the conveyor, the conveyor moves proximally such that the elongated grasping member moves to the second position (e.g., as depicted in FIG. 3C-D). In some embodiments, the system may include a loading mechanism 300. The loading mechanism may be coupled to a proximal end 310 of the tension mechanism. The loading mechanism may be inhibited by a second stop 320 when engaged from moving towards a distal end 320 of the housing. The second stop may include multiple stops 320a. Depressions 320b may mate with stops 320a when engaged. The loading mechanism may function to load tension on the tension mechanisms when used in combination with the conveyor. The loading mechanism whenten moved proximally and engaged to the second stop and the conveyor when moved distally and engaged to the first stop may apply tension to the tension mechanisms (e.g., as depicted in FIG. 3B).

In some embodiments, guides 250 may function to stabilize and/or guide elongated grasping members as they are conveyed from one position to another. The guides may direct elongated grasping members in one or more manners. For example the guides may keep the elongated grasping members substantially parallel to the housing and/or at a predetermined angle relative to the housing (the angle may change depending upon the position of the elongated grasping members relative to the housing. An orientation and/or angle of the elongated grasping members relative to the housing may be adjusted based upon the angle of the guides relative to the housing. The angle of the guides relative to the housing may be adjustable. Openings in the guides through which elongated grasping members travel may be angled to properly position and/or orient the elongated grasping members relative to the housing. The angle of the guide and guide opening may function together to properly orient the elongated grasping members relative to the housing.

In some embodiments, the tension mechanism 240 may include one or more springs. The tension mechanism may include two springs. The two springs may be positioned parallel to one another. In some embodiments, the tension mechanism may include one or more elastic bands. The elastic bands may be formed from a natural and/or synthetic material. The tension mechanism may include a material or mechanism with elastic properties.

In some embodiments, when the second stop is disengaged the tensile force on the tension mechanism is released. In some embodiments, when the second stop is disengaged the tensile force on the tension mechanism is released such that, for example, the workpiece is released (e.g., as depicted in FIG. 3A).

In some embodiments, the second stop is disengaged by manually applying pressure to a portion (e.g., a button or handle 330) of the loading mechanism. The portion of the loading mechanism may transfer the pressure/force to a portion of the stop such that the stop may disengage from the loading mechanism. Upon disengagement of the stop, tensile force on the tension mechanism may convey the loading mechanism towards the distal end of the housing releasing at least most of the tensile force on the tension mechanism. Releasing the tensile force may allow for disengagement of the elongated grasping members from, for example, a workpiece and/or allow for reloading the elongated grasping members such that the elongated grasping members may engage a workpiece (e.g., as depicted in FIG. 3A).

In some embodiments, the engaging mechanism is activated at a proximal end of the housing. In some embodiments, the engaging mechanism comprises an elongated engaging member 340 movable from a first position to a second position when activated. In some embodiments, the engaging mechanism comprises a spring 350 loaded elongated engaging member movable from a first position to a second position when activated. The spring may bias the elongated engaging member in the first position or the second position. The spring may bias the elongated engaging member in an unengaged position. The engaging mechanism when activated may apply pressure to the first stop such that the first stop disengages from the conveyor. The engaging mechanism may depress the first stop when the engaging mechanism is activated.

In some embodiments, the system may include at least two elongated grasping members 230. In some embodiments, the elongated grasping member comprises at least two elongated grasping members 230a-b positioned on opposing sides of the housing 220. Elongated grasping members positioned on either side of the housing may stabilize a workpiece relative to a single elongated grasping member. In some embodiments, the elongated grasping member 230 may include a distal grasping portion 370 which engages the workpiece during use. In some embodiments, the distal grasping portion may couple two elongated grasping members positioned on either side of the housing. The elongated grasping member may include a proximal portion 230c which is curved such that when the elongated grasping member moves from the first position to the second position the distal grasping portion moves up and back in a proximal direction. The distal grasping portion may move up and back in a proximal direction to better grasp the workpiece and move it against the system attachment.

The distal grasping portion 370 may include a hooked portion which holds the workpiece against a saw blade or other system attachment. In some embodiments, the distal grasping portion may include different shapes configured for different uses. In some embodiments, the distal grasping portion may be couplable to the elongated grasping member(s) such that the distal grasping portion may be coupled to or decoupled from the elongated grasping member(s). Couplable distal grasping portions may include a set of differently shaped grasping portions which may be interchanged for different situations and uses.

In some embodiments, the distal grasping portion may be formed from one or more different materials. Materials may be chosen based upon the intended use of the grasping portion. In some embodiments, the grasping portion may include one or more coatings applied to at least a portion of the grasping portion. In some embodiments, materials and/or coatings may function to increase a coefficient of friction between the grasping member and the workpiece. Increasing the coefficient of friction may inhibit a workpiece from dislodging from the grasping members during use. In some embodiments, the grasping member may include a pattern and/or other three-dimensional surface permutations to increase a coefficient of friction between the grasping member and the workpiece. A coating may include a soft coating which helps to inhibit damage to the workpiece during use.

In some embodiments, the system may include one elongated member coupled to a distal grasping portion. The elongated portion may be positioned on a first side or an opposing second side. The distal grasping portion may extend substantially across the width of the distal end of the housing from the first side to the second side such that the grasping portion includes a greater surface area. The increased surface area of the grasping portion may function to stabilize the workpiece against a system attachment when the grasping portion engages the workpiece.

In some embodiments, the system may include at least one track along which the conveyor and/or the loading mechanism are positionable. In some embodiments, an outer assembly housing 380 may function to keep the conveyor and/or the loading mechanism in alignment. An assembly cover 390 may function to inhibit a conveyor from repositioning out of the assembly. In some embodiments, the conveyor may be sized and shaped in a complementary manner to an interior opening of the assembly housing such that the conveyor is inhibited from moving laterally as the conveyor moves longitudinally through the assembly housing. In some embodiments, at least a first portion of the loading mechanism may be positionable within the assembly housing such that the loading mechanism is inhibited from moving laterally as the conveyor moves longitudinally through the assembly housing. In some embodiments, an elongated opening 400, through which the first portion is coupled to a second portion of the loading mechanism, function to inhibit lateral and/or longitudinal movement of the loading mechanism while being conveyed along the assembly housing.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A reciprocating saw system including a housing, comprising:
    a housing of a reciprocating saw;
    an elongated grasping member coupled to a distal end of the housing which when activated moves from a first position to a second position such that a workpiece is positioned, during use, adjacent at least the distal end of the housing and, during use, a reciprocating blade couplable to the distal end of the housing such that the reciprocating blade extends from the distal end of the housing;
    a tension mechanism, wherein when the tension mechanism is activated the tension mechanism moves the elongated grasping member from the first position to the second position;
    a conveyor coupled approximate to a distal end of the tension mechanism, wherein the conveyor is pivotally coupled approximate to a proximal end of the elongated grasping member;
    an engaging mechanism, positioned adjacent to a proximal end of the housing, which when activated releases a first stop positioned towards the distal end of the housing, wherein the first stop inhibits proximal movement of the conveyor, and wherein when the first stop is released, when a tensile force is applied to the conveyor, the conveyor moves from substantially adjacent the distal end of the housing to toward the proximal end of the housing such that the elongated grasping member is moved to the second position; and
    a loading mechanism coupled to a proximal end of the tension mechanism, wherein the loading mechanism is inhibited by a second stop when engaged from moving from approximate the proximal end of the housing towards the distal end of the housing, wherein when the loading mechanism is inhibited from moving by the second stop and the conveyor is inhibited from moving by the first stop the tension mechanism provides a tensile force to the conveyor, and wherein at least a portion of the second stop is positioned substantially toward the proximal end of the housing.

2. The system of claim 1, wherein when the second stop is disengaged the tensile force on the tension mechanism is released.

3. The system of claim 1, wherein when the second stop is disengaged the tensile force on the tension mechanism is released such that the workpiece is released.

4. The system of claim 1, wherein the second stop is disengaged by manually applying pressure to a portion of the loading mechanism.

5. The system of claim 1, wherein the engaging mechanism is activated at the proximal end of the housing.

6. The system of claim 1, wherein the engaging mechanism comprises a spring loaded elongated engaging member moveable from a first position to a second position when activated.

7. The system of claim 1, wherein the elongated grasping member comprises at least two elongated grasping members positioned on opposing sides of the housing.

8. The system of claim 1, wherein the elongated grasping member comprises:
    a distal grasping portion which engages the workpiece during use; and
    a proximal portion towards the proximal end which is curved such that when the elongated grasping member moves from the first position to the second position the distal grasping portion moves up and back in a proximal direction.

9. The system of claim 1, further comprising at least one track along which the conveyor and/or the loading mechanism are positionable.

10. A method of stabilizing a workpiece relative to a reciprocating saw system including a housing and a reciprocating saw blade, comprising:

activating a tension mechanism by applying a tensile force to the tension mechanism using a loading mechanism, wherein a distal end of the tension mechanism is coupled to a conveyor and a proximal end of the tension mechanism is coupled to the loading mechanism, wherein the conveyor is pivotally coupled approximate to a proximal end of the elongated grasping member;

inhibiting the loading mechanism using a second stop when engaged from moving from substantially adjacent a proximal end of the housing towards a distal end of the housing, wherein at least a portion of the second stop is positioned substantially adjacent the distal end of the housing;

activating an engaging mechanism, positioned adjacent to the proximal end of the housing, to release a first stop, positioned towards the distal end of the housing, wherein the first stop inhibits proximal movement of the conveyor, and wherein when the first stop is released, when a tensile force is applied to the conveyor, the conveyor moves from substantially adjacent the distal end of the housing to adjacent the proximal end of the housing;

moving an elongated grasping member from a first position to a second position using the conveyor; and positioning a workpiece, using the elongated grasping member, adjacent at least a portion of a housing and a reciprocating blade, wherein the reciprocating blade is couplable to and extends from the housing.

11. The method of claim 10, wherein activating the tension mechanism comprises:

positioning the loading mechanism towards the proximal end of the housing and inhibiting movement of the loading mechanism using the second stop; and positioning the conveyor towards the distal end of the housing and inhibiting movement of the conveyor using the first stop.

12. The method of claim 10, further comprising releasing the tensile force on the tension mechanism by disengaging the second stop.

13. The method of claim 10, further comprising disengaging the second stop such that the tensile force on the tension mechanism is released releasing the workpiece.

14. The method of claim 10, further comprising applying pressure to a portion of the loading mechanism such that the second stop is disengaged.

15. The method of claim 10, wherein the engaging mechanism is activated at the proximal end of the housing.

16. The method of claim 10, wherein the engaging mechanism comprises a spring loaded elongated engaging member moveable from a first position to a second position when activated.

17. The method of claim 10, wherein the elongated grasping member comprises at least two elongated grasping members positioned on opposing sides of the housing.

18. The method of claim 10, wherein moving the elongated grasping member comprises:

engaging the workpiece using a distal grasping portion; and moving the distal grasping portion up and back in a proximal direction, when the elongated grasping member moves from the first position to the second position, using a proximal portion which is curved.

19. The method of claim 10, further comprising at least one track along which the conveyor and/or the loading mechanism are positionable.

\* \* \* \* \*